(12) United States Patent
Turnquist et al.

(10) Patent No.: US 6,261,057 B1
(45) Date of Patent: Jul. 17, 2001

(54) ARRANGEMENT AND METHOD FOR ACCURATELY RADIALLY LOCATING A TURBINE BRUSH SEAL

(75) Inventors: Norman Arnold Turnquist, Carlisle; Frederick George Baily, Ballston Spa; Lawrence Edward Rentz, Clifton Park, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/412,072

(22) Filed: Oct. 4, 1999

(51) Int. Cl.$^7$ ....................................................... F01D 5/00
(52) U.S. Cl. ........................................................ 415/174.2
(58) Field of Search ............................. 415/170.1, 174.2, 415/174.3, 174.5, 229, 230; 277/355, 413, 416, 421, 422, 303, 305

(56) References Cited

U.S. PATENT DOCUMENTS

| | | | |
|---|---|---|---|
| 5,630,590 | 5/1997 | Bouchard et al. | 277/53 |
| 5,749,584 | 5/1998 | Skinner et al. | 277/53 |
| 5,890,873 | 4/1999 | Willey | 415/173.5 |

FOREIGN PATENT DOCUMENTS 2301635  11/1996  (GB).

OTHER PUBLICATIONS

AIAA–97–2730 "Brush Seals in Industrial Gas Turbines" by C.E. Wolfe et al, presented at the 33$^{nd}$ Joint Propulsion Conference & Exhibit on Jul. 6–9, 1997, Seattle WA.

Primary Examiner—Edward K. Look
Assistant Examiner—Hermes Rodriguez

(57) ABSTRACT

An arrangement and method for accurately radially locating a brush seal relative to a rotor provides a labyrinth seal segment having a slot open toward the rotor and defining an interior ledge facing away from the rotor, a brush seal segment inserted in the slot and having an exterior shoulder facing toward the rotor and overlying the interior ledge of the labyrinth seal segment such that the brush seal segment can move radially relative to the labyrinth seal segment and rotor and the shoulder of the brush seal segment can move toward and away from the interior ledge of the labyrinth seal segment, and set screws tightened into spaced apart threaded holes in the labyrinth seal segment forcing the shoulder of the brush seal segment against the ledge of the labyrinth seal segment so as to prevent radial floating of the brush seal segment relative to the labyrinth seal segment.

13 Claims, 2 Drawing Sheets

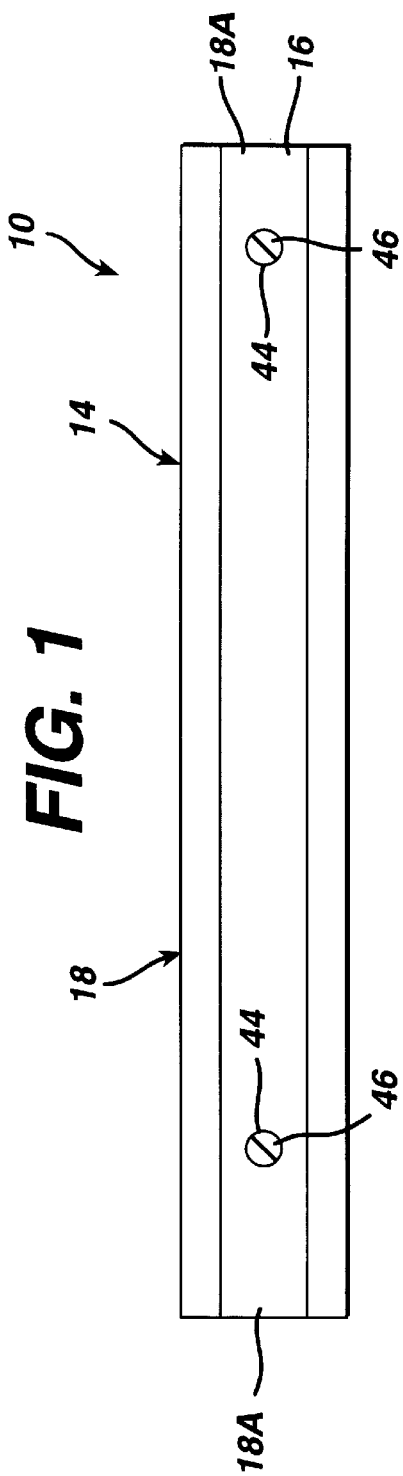
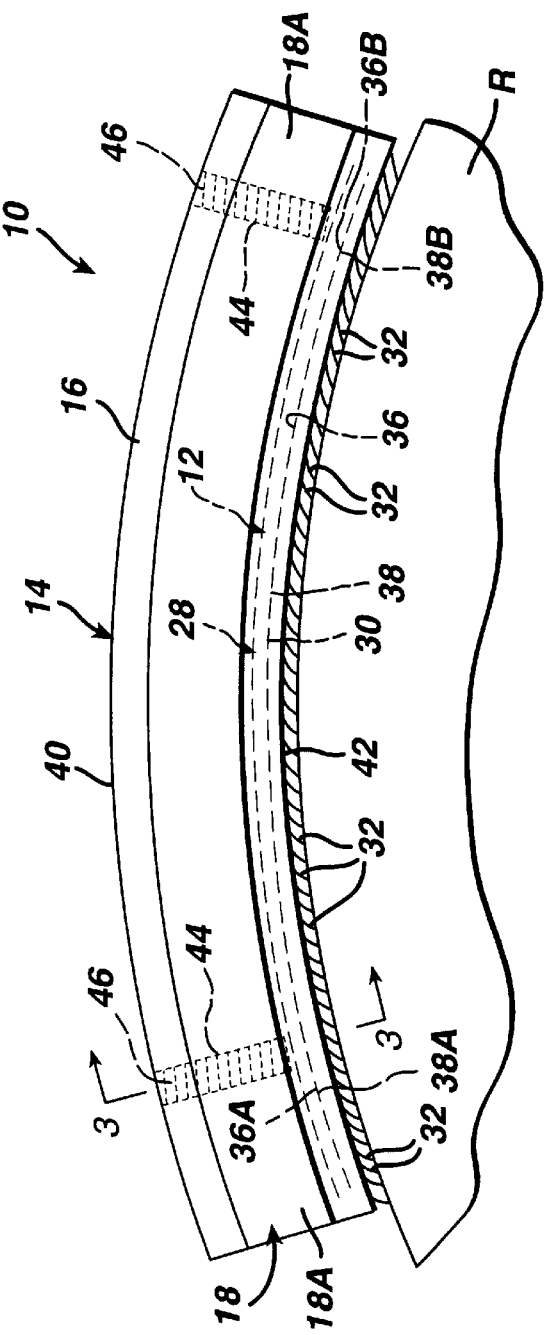

US 6,261,057 B1

ARRANGEMENT AND METHOD FOR ACCURATELY RADIALLY LOCATING A TURBINE BRUSH SEAL

BACKGROUND OF THE INVENTION

The present invention generally relates to brush seals for rotary machines, such as steam and gas turbines, and, more particularly, is concerned with an arrangement and method for accurately radially locating a brush seal at a desired position relative to a rotor of the machine.

Rotary machines, such as steam and gas turbines, used for power generation and mechanical drive applications are generally large machines having multiple turbine stages. In turbines, high pressure fluid flowing through the turbine stages must pass through a series of stationary and rotary components, and seals typically are used between the stationary and rotating components to minimize leakage of the fluid. The efficiency of the turbine is dependent on the ability of the seals to prevent fluid leakage.

Traditionally, one type of seal that is used to control fluid leakage in turbines is a labyrinth seal which has sharp rigid teeth. While the labyrinth seal has proven to be quite reliable, its performance degrades over time. This occurs as a result of transient events in which the stationary and rotating components move radially relative to and thus interfere with one another causing rubbing on the teeth of the labyrinth seal so as to enlarge the clearance between the stationary and rotating components and allow increase of leakage.

Another type of seal that is used in combination with the labyrinth seal to improve leakage control is a brush seal. The brush seal is generally less prone to leakage than the labyrinth seal because the brush seal has seal bristles that can flex and thus better accommodate the relative radial movement between the stationary and rotating components. The brush seal also generally conforms better to surface non-uniformities than does the labyrinth seal. Such combination brush and labyrinth seal arrangements are disclosed in U.S. Pat. No. 5,749,584 to Skinner et al. assigned to General Electric Company, the assignee of the present invention, and U.K. Pat. Application No. 2,301,635 to Hemsley et al assigned to GEC Alsthom Limited.

In combination brush and labyrinth seal arrangements, accurate radial positioning of the brush seal relative to the rotor must be achieved in order to gain optimum performance while not adversely affecting rotordynamics. In the current method of assembly, a slot is provided in the labyrinth seal to receive the brush seal. The cross-sectional size of the slot is larger than the cross-sectional size of the portion of the brush seal that is received in the slot to facilitate the ease of mounting of the brush seal to the labyrinth seal. The larger cross-sectional size of the slot results in there being sufficient radial clearance between the brush seal and labyrinth seal to allow the brush seal to "float" radially within the slot, making it difficult to accurately align the brush seal to the rotor. The current method may allow the seal radial position to vary by several thousandths of an inch over its arc length. These variations may reduce the desired seal performance.

Consequently, a need exists for an innovation which will provides an effective solution to the aforementioned problem without introducing any new problems in place thereof.

BRIEF SUMMARY OF THE INVENTION

The present invention provides an arrangement and method for accurately radially locating a turbine brush seal which are designed to satisfy the aforementioned need. The arrangement and method of the present invention provide the brush seal at a desired position relative to the rotor so as to enhance seal performance. The current method of assembly of the brush seal to the labyrinth seal is generally retained but without allowing the brush seal to "float" radially within the slot of the labyrinth seal. Instead, once the brush seal is inserted into the slot of the labyrinth seal and positioned circumferentially relative thereto, set screws are then used to force the brush seal into the desired radial position relative to the labyrinth seal. This seemingly simple added element of the arrangement and step of the method permits the achievement of total control circumferentially and radially of the location of the brush seal relative to the labyrinth seal.

In one embodiment of the present invention, an arrangement and method are provided for accurately radially locating a turbine brush seal relative to a main seal, such as a labyrinth seal, and a turbine rotor. The arrangement and method employ a main seal segment and a brush seal segment. The main seal segment has a slot open toward the rotor and defining an interior ledge facing away from the rotor. The brush seal segment has an exterior shoulder facing toward the rotor and a portion smaller in size cross-sectionally than the slot so as to allow insertion of the brush seal segment into the slot where the shoulder of the brush seal segment overlies the interior ledge of the main seal segment and the brush seal segment can move radially relative to the main seal segment and rotor and the shoulder of the brush seal segment can move toward and away from the interior ledge of the main seal segment. The arrangement and method further employ means for forcing the brush seal segment toward the rotor such that spaced apart locations on the shoulder of the brush seal segment are brought into contact with spaced apart locations on the ledge of the main seal segment so as to place and maintain the shoulder of the brush seal segment in substantial engagement with the ledge of the main seal segment and thereby prevent radial floating of the brush seal segment relative to the main seal segment and rotor.

The main seal segment has an arcuate shape for placing the main seal segment about the rotor, an outer periphery facing away from the rotor, an inner periphery spaced radially inwardly from the outer periphery and facing toward the rotor, and a slot defined in the main seal segment between the outer and inner peripheries thereof. The slot has a radial portion open at the inner periphery and extending away from the rotor toward the outer periphery and an axial portion spaced from the outer and inner peripheries and merging in a transverse relationship from a side of the radial portion along the rotor so as to define the interior ledge in the main seal segment facing away from the rotor. The brush seal segment has an arcuate shape for conforming to the arcuate-shaped main seal segment, a radial section, and an axial section connected to and merging in a transverse relationship from a side of the radial section so as to define the exterior shoulder on the brush seal segment facing toward the rotor such that the radial and axial sections of the brush seal segment conform in shape to the radial and axial portions of the slot of the main seal segment as to slidably fit therein with the brush seal segment being movable radially relative to the main seal segment and rotor and with the shoulder of the brush seal segment overlying and being movable toward and away from the interior ledge of the main seal segment. The means for forcing the brush seal segment toward the rotor includes at least two threaded holes extending through the main seal segment to the slot at spaced apart locations on the main seal segment and at least two screws each being tightened into one of the threaded holes of the main seal segment and into contact with the spaced apart locations on the brush seal segment so as to place and maintain the shoulder of the brush seal segment substantially engaged with the ledge of the main seal segment.

BRIEF DESCRIPTION OF THE DRAWINGS

FIG. 1 is a top plan view of a seal arrangement of the present invention.

FIG. 2 is a side elevational view of the seal arrangement of FIG. 1.

DETAILED DESCRIPTION OF THE INVENTION

Figure 3:
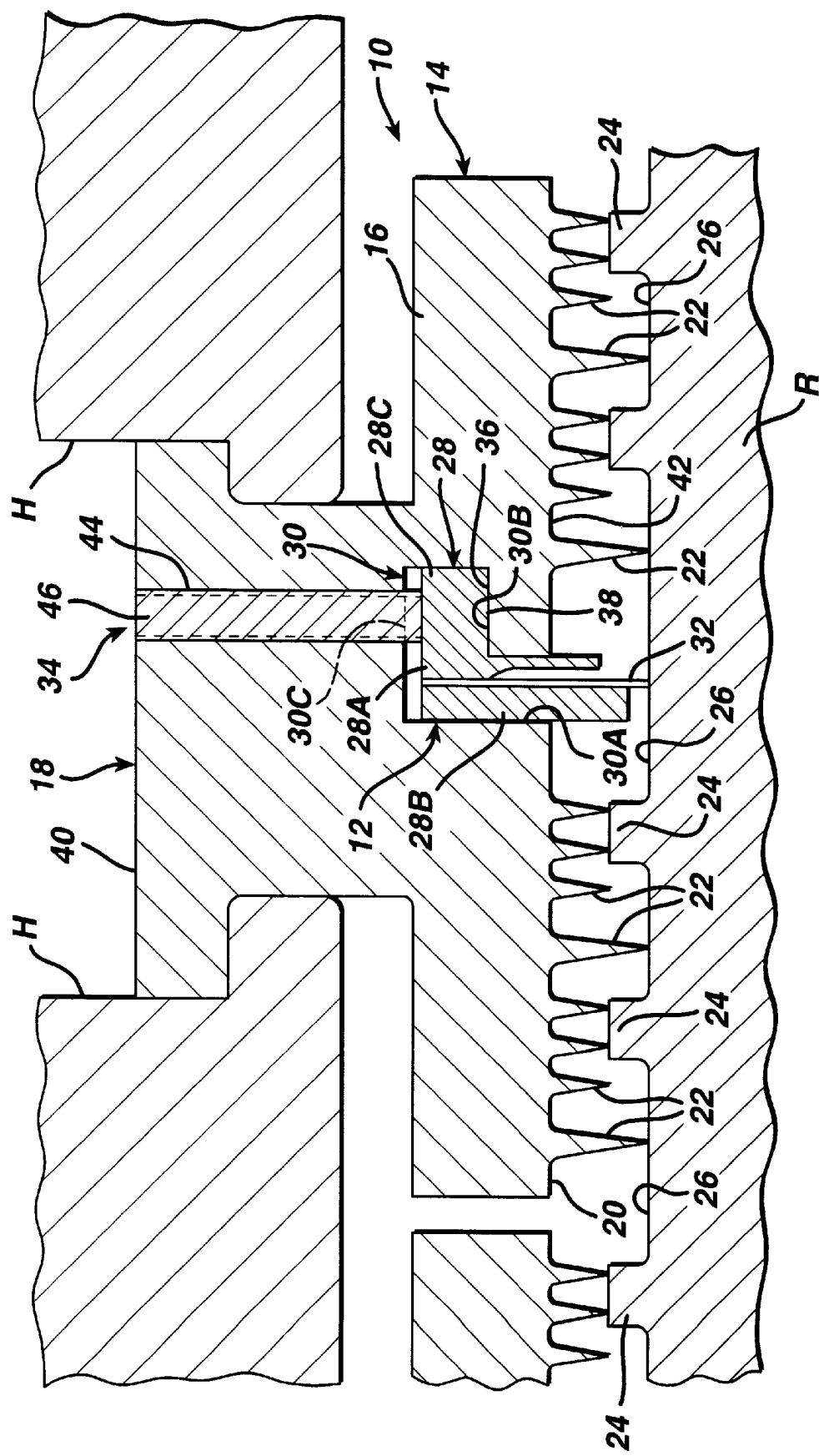
FIG. 3 is an enlarged cross-sectional view of the seal arrangement taken along line 3—3 of FIG. 2.

Referring now to FIGS. 1 to 3 of the drawings, there is illustrated a seal arrangement of the present invention, generally designated 10, for accurately locating an annular brush seal 12 relative to an annular main seal 14, such as a labyrinth seal, and to a turbine shaft or rotor R. The annular labyrinth seal 14 is mounted in a turbine housing H and extends about the rotor R which is supported by conventional means, not shown, within the turbine housing H. The labyrinth seal 14 is disposed between the rotating rotor R and stationary housing H and includes a seal ring 16 disposed about the rotor R separating high and low pressure regions on axially opposite sides of the ring 16. It will be appreciated that while only one seal ring 16 is disclosed, typically multiple-stage labyrinth seals are provided about the rotor R.

Each seal ring 16 is formed of an annular array of a plurality of arcuate-shaped main seal segments 18 having sealing faces 20 and a plurality of radially projecting, axially spaced teeth 22. In one example, the teeth 22 are of a hi-lo design for obtaining close clearances with radial projections or ribs 24 and grooves 26 on the rotor R. The labyrinth seal 14 functions by placing a relatively large number of barriers, i.e., the teeth 22, to the flow of fluid from a high pressure region to a low pressure region on opposite sides of the seal 16, with each barrier forcing the fluid to follow a tortuous path.

The annular brush seal 12 is formed of an annular array of a plurality of arcuate-shaped brush seal segments 28 incorporated as a retrofit to or as original equipment in the labyrinth seal 14. One or more teeth 22 of the labyrinth seal 14 are removed and replaced with the brush seal 12. As seen in FIG. 3, a centrally-located labyrinth seal tooth 22 is removed and a slot 30 is formed in the seal ring 16 in its place for receiving the brush seal segments 28 therein. Each of the brush seal segments 28 making up the brush seal 12 has a plurality of bristles 32 which engage the rotor R about the circumference thereof.

Referring to FIG. 3, the arrangement 10 of the present invention basically includes a brush seal segment 28, a main seal segment 18 and means 34 for forcing the brush seal segment 28 toward the rotor R. The main seal segment 18 has the slot 30 which is open toward the rotor R and defines an interior ledge 36 facing away from the rotor R. The brush seal segment 28 defines an exterior shoulder 38 facing toward the rotor R and has a portion 28A which is smaller in size cross-sectionally than the slot 30 so as to allow insertion of the portion 28A of the brush seal segment 28 into the slot 30 such that the exterior shoulder 38 of the brush seal segment 28 overlies the interior ledge 36 of the main seal segment 18, the brush seal segment 28 can move radially relative to the main seal segment 18 and rotor R, and the exterior shoulder 38 of the brush seal segment 28 can move toward and away from the interior ledge 36 of the main seal segment 18. The means 34 for forcing the brush seal segment 28 toward the rotor R brings the shoulder 38 of the brush seal segment 28 at least at two spaced apart locations 38A, 38B thereon into contact with at least two spaced apart locations 36A, 36B on the ledge 36 of the main seal segment 18 so as to place and maintain the shoulder 38 of the brush seal segment 28 in substantial engagement with the ledge 36 of the main seal segment 18 and thereby prevent radial floating of the brush seal segment 28 relative to the main seal segment 18 and rotor R.

More particularly, the main seal segment 18 is arcuate shaped for placing the main seal segment 18 about the curvature of the rotor R and has an outer periphery 40 facing away from the rotor R, an inner periphery 42 spaced radially inwardly from the outer periphery 40 and facing toward the rotor R and the slot 30 defined in the main seal segment 18 between the outer and inner peripheries 40, 42 thereof. The slot 30 has a radial portion 30A and an axial portion 30B. The radial portion 30A is open at the inner periphery 42 of the main seal segment 18 and extends away from the rotor R toward the outer periphery 40. The axial portion 30B is spaced from the outer and inner peripheries 40, 42 of the main seal segment 18 and merges in a transverse relationship from a side of the radial portion 30A along the rotor R so as to define the interior ledge 38 in the main seal segment 18 facing away from the rotor R. The brush seal segment 28 is arcuate-shaped for conforming to the arcuate-shaped main seal segment 18 and has a radial section 28B and an axial section 28C. The axial section 28C is connected to and merges in a transverse relationship from a side of the radial section 28B so as to define the exterior shoulder 36 on the brush seal segment 28 facing toward the rotor R such that the radial and axial sections 28B, 28C of the brush seal segment 28 conform in shape to the radial and axial portions 30A, 30B of the slot 30 of the main seal segment 18 as to slidably fit therein and the brush seal segment 28 is movable radially relative to the main seal segment 18 and rotor R and the shoulder 36 of the brush seal segment 28 overlies and is movable toward and away from the interior ledge 38 of the main seal segment 18.

The means 34 for forcing the brush seal segment 28 toward the rotor R includes at least two threaded holes 44 and at least two set screws 46. The two threaded holes 44 extend through the main seal segment 18 to the slot 30 at spaced apart locations on the main seal segment 18 adjacent to opposite ends 18A thereof. Each of the two set screws 46 is tightened into one of the threaded holes 44 of the main seal segment 18 and into contact with the spaced apart locations on the axial section 28C of the brush seal segment 28 so as to place and maintain the shoulder 36 of the brush seal segment 28 in the substantial engagement with the ledge 38 of the main seal segment 18. By providing a set screw 46 at each end 18A of the main seal segment 18, it is assured that the brush seal segment 28 is not contacting the interior ledge 38 at one of the opposite ends 28A and a top interior surface 30C of the slot 30 opposite from the ledge 38 at the other of the opposite ends 28A. If desired, a third set screw (not shown) can be employed at the segment midpoint to further ensure contact with the interior ledge 38 on brush seal segments whose curvature may be mismatched to the labyrinth seal curvature.

It is noted that, if needed, a shim (not shown) may be disposed radially between the ledge 38 (such as at 38*a* and at 38*b*) of the main seal segment 18 and the shoulder 36 (such as at 36*a* and at 36*b*) of the brush seal segment 28 to raise the tips (i.e., the free ends) of the bristles 32 away from the rotor R for precise radial positioning of the bristles 32.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

What is claimed is:

1. An arrangement for accurately locating a turbine brush seal relative to a turbine rotor, comprising:
    a main seal segment having a slot open toward a turbine rotor and defining an interior ledge facing away from the rotor;
    a brush seal segment having an exterior shoulder facing toward the rotor and a portion smaller in size cross-sectionally than said slot of said main seal segment so as to allow insertion of said brush seal segment into said slot such that said shoulder of said brush seal segment overlies said interior ledge of said main seal segment and said brush seal segment can move radially relative to said main seal segment and rotor and said shoulder of said brush seal segment can move toward and away from said interior ledge of said main seal segment; and
    means for forcing said brush seal segment toward the rotor such that spaced apart locations on said shoulder of said brush seal segment are brought into contact with spaced apart locations on said ledge of said main seal segment so as to place and maintain said shoulder of said brush seal segment in substantial engagement with said ledge of said main seal segment and thereby prevent radial floating of said brush seal segment relative to said main seal segment and to the rotor.

2. The arrangement of claim 1 wherein said main seal segment is a labyrinth seal segment.

3. The arrangement of claim 1 wherein said main seal segment is arcuate-shaped for placing said main seal segment about the rotor and has an outer periphery facing away from the rotor, an inner periphery spaced radially inwardly from said outer periphery and facing toward the rotor and a slot defined in said main seal segment between said outer and inner peripheries thereof, said slot having a radial portion open at said inner periphery and extending away from the rotor toward said outer periphery and an axial portion spaced from said outer and inner peripheries and merging in a transverse relationship from a side of said radial portion of said slot along the rotor so as to define said interior ledge in said main seal segment facing away from the rotor.

4. The arrangement of claim 3 wherein said brush seal segment is arcuate-shaped for conforming to said arcuate-shaped main seal segment and has a radial section and an axial section connected to and merging in a transverse relationship from a side of said radial section so as to define said exterior shoulder on said brush seal segment facing toward the rotor such that said radial and axial sections of said brush seal segment conform in shape and size relative to said radial and axial portions of said slot of said main seal segment so as to slidably fit therein with said brush seal segment movable radially relative to said main labyrinth seal segment and rotor and with said shoulder of said brush seal segment overlying and movable toward and away from said interior ledge of said main seal segment.

5. The arrangement of claim 1 wherein said means for forcing said brush seal segment toward the rotor includes at least two threaded holes extending through said main seal segment to said slot at spaced apart locations on said main seal segment.

6. The arrangement of claim 5 wherein said means for forcing said brush seal segment toward the rotor further includes at least two screws each being tightened into one of said threaded holes of said main seal segment and into contact with said brush seal segment at spaced apart locations thereon so as to place and maintain said shoulder of said brush seal segment in said substantial engagement with said ledge of said main seal segment.

7. An arrangement for accurately locating a turbine brush seal relative to a turbine rotor, comprising:
    a labyrinth seal segment being arcuate-shaped for placing about a turbine rotor and having an outer periphery facing away from the rotor, an inner periphery spaced radially inwardly from said outer periphery and facing toward the rotor, and a slot defined in said labyrinth seal segment between said outer and inner peripheries thereof and having a radial portion open at said inner periphery and extending away from the rotor toward said outer periphery and an axial portion spaced from said outer and inner peripheries and merging in a transverse relationship from a side of said radial portion of said slot along the rotor so as to define an arcuate-shaped interior ledge in said labyrinth seal segment facing away from the rotor, said labyrinth seal segment also having at least two threaded holes extending therethrough from said outer periphery thereof to said axial portion of said slot and being spaced apart from one another along an arcuate length of said labyrinth seal segment;
    a brush seal segment being arcuate-shaped for conforming to the shape of said labyrinth seal segment, said brush seal segment having a radial section and an axial section connected to and merging in a transverse relationship from a side of said radial section so as to define an arcuate-shaped exterior shoulder on said brush seal segment facing toward the rotor, said brush seal segment having a portion being smaller in size cross-sectionally than said slot in said labyrinth seal segment such that said radial and axial sections of said brush seal segment are slidably fitted into said radial and axial portions of said slot of said labyrinth seal segment with said brush seal segment movable radially relative to said labyrinth seal segment and rotor and with said shoulder of said brush seal segment overlying and movable toward and away from said interior ledge of said labyrinth seal segment; and
    at least two screws each of which is tightened into one of said threaded holes of said labyrinth seal segment forcing said brush seal segment toward the rotor such that said screws contact spaced apart locations on said brush seal segment so as to bring and maintain said shoulder of said brush seal segment in substantial engagement with said ledge of said labyrinth seal segment and thereby prevent radial floating of said brush seal segment relative to said labyrinth seal segment and the rotor.

8. A method for accurately locating a turbine brush seal relative to a turbine rotor, comprising the steps of:
    providing a main seal segment having a slot open toward a turbine rotor and defining an interior ledge facing away from the rotor;

providing a brush seal segment having an exterior shoulder facing toward the rotor and a portion smaller in size cross-sectionally than the slot of the main seal segment such that the brush seal segment can slidably fit into the slot of the main seal segment;

slidably inserting the brush seal segment into the slot of the main seal segment such that the brush seal segment can move radially relative to the main seal segment and rotor and the shoulder of the brush seal segment overlies and can move toward and away from the interior ledge of the main seal segment; and forcing the brush seal segment toward the rotor such that spaced apart locations on the shoulder of the brush seal segment are brought into contact with spaced apart locations on the ledge of the main seal segment so as to place and maintain the shoulder of the brush seal segment in substantial engagement with the ledge of the main seal segment and thereby prevent radial floating of the brush seal segment relative to the main seal segment and the rotor.

9. The method of claim 8 wherein the main seal segment is a labyrinth seal segment.

10. The method of claim 8 wherein said main seal segment is provided with an arcuate shape for placing the main seal segment about the rotor, an outer periphery facing away from the rotor, an inner periphery spaced radially inwardly from the outer periphery and facing toward the rotor and a slot defined in the main seal segment between the outer and inner peripheries thereof, said slot having a radial portion open at said inner periphery and extending away from the rotor toward said outer periphery and an axial portion spaced from said outer and inner peripheries and merging in a transverse relationship from a side of said radial portion of said slot along the rotor so as to define said interior ledge in said main seal segment facing away from the rotor.

11. The method of claim 8 wherein the brush seal segment is provided with an arcuate shape for conforming to the arcuate shape of the main seal segment, a radial section, and an axial section connected to and merging in a transverse relationship from a side of the radial section so as to define the exterior shoulder on the brush seal segment facing toward the rotor such that the radial and axial sections of the brush seal segment conform in shape and size relative to the radial and axial portions of the slot of the main seal segment as to slidably fit therein and the brush seal segment is movable radially relative to the main seal segment and rotor and the shoulder of the brush seal segment overlies and is movable toward and away from the interior ledge of the main seal segment.

12. The method of claim 8 wherein the brush seal segment is forced toward the rotor by providing at least two threaded holes extending through the main seal segment to the slot at spaced apart locations on the main seal segment and by providing at least two screws each being tightened into one of the threaded holes of the main seal segment and into contact with the spaced apart locations on the brush seal segment so as to place and maintain the shoulder of the brush seal segment in the substantial engagement with the ledge of the main seal segment.

13. A method for accurately locating a turbine brush seal relative to a turbine rotor, comprising the steps of:

providing a labyrinth seal segment with an arcuate shape for placing about a turbine rotor, an outer periphery facing away from the rotor, an inner periphery spaced radially inwardly from the outer periphery and facing toward the rotor and a slot defined in the labyrinth seal segment between the outer and inner peripheries thereof and having a radial portion opening at the inner periphery extending away from the rotor toward the outer periphery and an axial portion spaced from the outer and inner peripheries and merging in a transverse relationship from a side of the radial portion of the slot along the rotor so as to define an annular-shaped interior ledge in the labyrinth seal segment facing away from the rotor;

providing a brush seal segment with an arcuate shape for conforming to the arcuate shape of the labyrinth seal segment, a radial section and an axial section connected to and merging in a transverse relationship from a side of the radial section so as to define an arcuate-shaped exterior shoulder on the brush seal segment facing toward the rotor such that radial and axial sections of the brush seal segment conform in shape and size relative to the radial and axial portions of the slot of the main seal segment as to slidably fit therein and the brush seal segment is movable radially relative to the main seal segment and rotor and the shoulder of the brush seal segment overlies and is movable toward and away from the interior ledge of the main seal segment;

slidably inserting the brush seal segment into the slot of the labyrinth seal segment such that the radial section of the brush seal segment fits in the radial portion of the slot of the labyrinth seal segment and the axial section of the brush seal segment fits in the axial portion of the slot of the labyrinth seal segment; and providing at least two threaded holes extending through the labyrinth seal segment from the outer periphery thereof to the axial portion of the slot and being spaced from one another along an arcuate length of the labyrinth seal segment; and screwing a screw into each of the two threaded holes of the labyrinth seal segment and into contact with spaced apart locations on the brush seal segment so as to bring and maintain the shoulder of the brush seal segment in substantial engagement with the ledge of the labyrinth seal segment so as to prevent radial floating of the brush seal segment relative to the labyrinth seal segment and the rotor.

* * * * *